United States Patent
Pennington (10) Patent No.: US 11,086,203 B2
(45) Date of Patent: Aug. 10, 2021

(54) FLOATABLE MOUNT FOR A HUNTING CAMERA

(71) Applicant: Jesse Pennington, Liberty, TX (US)

(72) Inventor: Jesse Pennington, Liberty, TX (US)

( * ) Notice: Subject to any disclaimer, the term of this patent is extended or adjusted under 35 U.S.C. 154(b) by 0 days.

(21) Appl. No.: 16/988,577

(22) Filed: Aug. 7, 2020

(65) Prior Publication Data

US 2021/0041771 A1     Feb. 11, 2021

Related U.S. Application Data

(60) Provisional application No. 62/884,057, filed on Aug. 7, 2019.

(51) Int. Cl.
| | | |
|---|---|---|
| *G03B 17/56* | (2021.01) | |
| *F16M 11/04* | (2006.01) | |
| *F16M 11/08* | (2006.01) | |
| *F16M 11/28* | (2006.01) | |
| *A01M 31/00* | (2006.01) | |

(52) U.S. Cl.
CPC ........... *G03B 17/561* (2013.01); *F16M 11/04* (2013.01); *F16M 11/08* (2013.01); *F16M 11/28* (2013.01); *A01M 31/002* (2013.01); *F16M 2200/08* (2013.01)

(58) Field of Classification Search
CPC ...... G03B 17/08; G03B 17/02; G03B 17/561; H04N 5/2252; H04N 5/2256; H04N 7/183; H04N 5/23245; H04N 7/18; H04N 7/181; H04N 5/23206; F16M 11/10; F16M 11/041; F16M 11/18; F16M 13/00; G06K 9/00771

USPC ................ 396/25–29, 428; 348/81, 143
See application file for complete search history.

(56) References Cited

U.S. PATENT DOCUMENTS

| | | | |
|---|---|---|---|
| 1,736,825 A | 11/1929 | Griffin | |
| 5,505,645 A | 4/1996 | Engler, Jr. | |
| 5,823,121 A | 10/1998 | Reiter | |
| 7,131,231 B1 * | 11/2006 | Lee | A01K 93/02 43/17 |
| 9,823,070 B2 * | 11/2017 | Stephens, Jr. | H04N 5/23203 |
| 2004/0208499 A1 * | 10/2004 | Grober | B63B 29/12 396/428 |
| 2010/0155549 A1 | 6/2010 | Robinson | |

(Continued)

FOREIGN PATENT DOCUMENTS

WO     WO2019023738 A1     2/2019

*Primary Examiner* — Clayton E. LaBalle
*Assistant Examiner* — Warren K Fenwick (57) ABSTRACT

A floatable mount for a hunting camera provides an apparatus that enables protection of a camera for the duration of the camera's placement outside. The apparatus further protects the camera from damage due to rising water levels. The apparatus has a telescopic pole, allowing the user to extend a camera and place it in a higher, more advantageous position. The apparatus may be placed and secured onto the ground through the use of a foot pressure platform and a corkscrew or straight anchor. The apparatus also employs a flotation device that can keep the camera afloat safely above the water level when flooding occurs, or when the apparatus is placed into a body of water. The combination of these features allows the user to mount their camera safely, without having to worry about the camera falling into, or otherwise becoming damaged from, rising water levels.

19 Claims, 6 Drawing Sheets

(56) References Cited

U.S. PATENT DOCUMENTS

| | | |
|---|---|---|
| 2013/0222581 A1 | 8/2013 | Wydner et al. |
| 2016/0106187 A1 | 4/2016 | Sloan et al. |
| 2019/0353985 A1* | 11/2019 | Austin .................. G03B 17/08 |

* cited by examiner

FLOATABLE MOUNT FOR A HUNTING CAMERA

The current application claims a priority to the U.S. Provisional Patent application Ser. No. 62/884,057 filed on Aug. 7, 2019.

FIELD OF THE INVENTION

The present invention relates generally to a camera mount. More specifically, the present invention is a floatable mount for a hunting camera that can be extended and contracted to desirable heights in response to rising water levels and simultaneously has the ability to mount onto sturdy flora.

BACKGROUND OF THE INVENTION

With the advent of new technologies, hunting, both as a sport and for sustenance, has come a long way from its origins. Beyond the varieties of weaponry available, it is now possible for a hunter to investigate an area for wildlife before investing several early-morning hours to an area of potentially sparse wildlife. It is now common practice for hunters to scout out an area in consideration for a hunt to find out what types and approximate quantities of animals live in the surroundings. Such scouting determines not only whether appropriate prey is available, such as fowl or deer, but also whether dangerous animals, such as bears or other such predators, are in proximity.

One of the primary methods by which a hunter may gather information is by setting up a trail camera in a high place or near a body of water to capture the lives of nearby animals. Such cameras are designed for potentially long exposures to inclement weather, such as heat or light rain. Unfortunately, many of these cameras are not adequately equipped for heavy water conditions. Areas which sometimes experience heavy rain and flooding can damage the camera or prevent it from working as intended. Hunters may also need to place the camera in higher positions but are often unable to reach as far as they may need without excessive inconvenience. Furthermore, many current trail camera setups are only available to be positioned on a tree or similar locations. Some accessories a hunter may purchase are able to extend upwards but cannot be mounted and are not able to float. What is needed is a device that can extend to avoid damage due to rising water levels. Further desirable is a device that allows a user to manually extend a camera into a higher position.

The present invention solves all the issues mentioned above by providing a new camera mounting device. The present invention has a telescopic pole, allowing the user to extend a camera and place it in a higher, more advantageous position. The present invention may be placed and secured on the ground through the use of a platform and a corkscrew anchor. The present invention also employs a flotation device that can keep the camera afloat when flooding occurs or when placed into a body of water. The combination of all these features allows the user to mount their camera safely, without having to worry about the camera sinking into, or otherwise becoming damaged from, rising water levels. If the telescopic pole is anchored in place, then the telescopic pole rises along with the flotation device to keep the camera out of the water as water levels rise. This also keeps the camera in its original position, as the camera and mounting system does not float away.

DETAILED DESCRIPTION OF THE INVENTION

All illustrations of the drawings are for the purpose of describing selected versions of the present invention and are not intended to limit the scope of the present invention.

Figure 1:
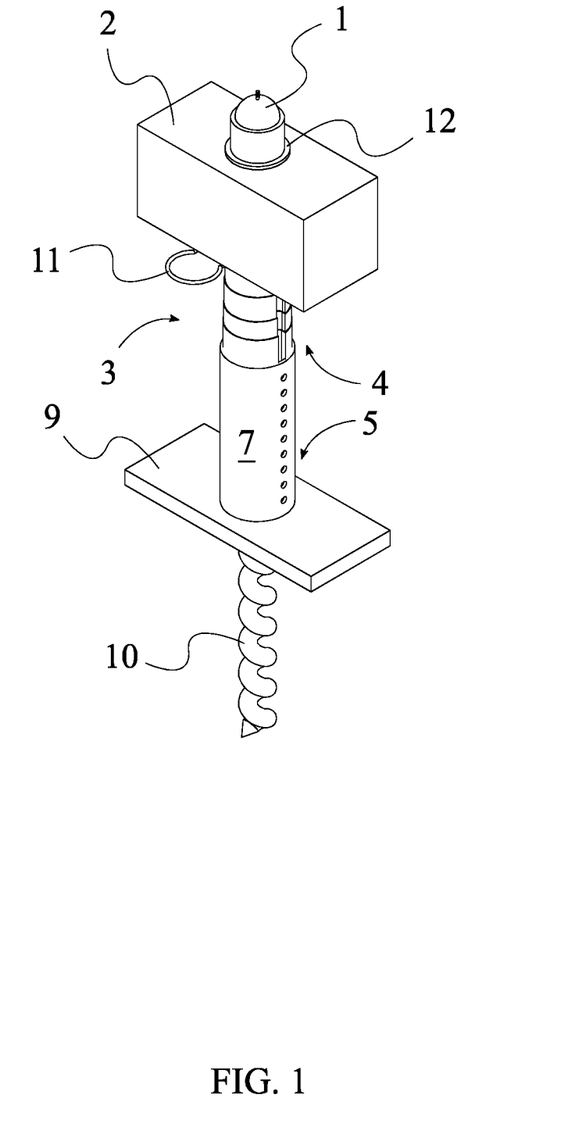
FIG. 1 is a top-left perspective view of the present invention.

The present invention is a floatable mount for a hunting camera that is used to allow a hunter to safely mount a camera at different heights in a desirable hunting location. The present invention is also configured to prevent water damage in high-risk flooding areas by providing a buoyant unit, thus allowing the mount to telescope to a safe height for the camera. A preferred embodiment of the present invention comprises a camera-attachment mechanism 1, a buoyant body 2, a telescopic pole 3, a base platform 9, and a ground anchor 10, as shown in FIG. 1. The camera-attachment mechanism 1 can be an adjustable fastener, clamp, ball-and-socket joint, or other device capable of securely connecting a video camera to the present invention. The buoyant body 2 relates to a container or device for retaining materials of lower density than water, especially for retaining air. The telescopic pole 3 relates to a set of rigid members interlocked within each other, thus enabling the present invention to lengthen or shorten its height as desirable. The base platform 9 is a rigid pressurizing plate that provides leverage for the user to apply downward force onto the ground anchor 10, thus securing the present invention in place during use. The ground anchor 10 is a rigid extrusion that enables the present invention to be planted into the ground.

The general configuration of the aforementioned components allows the present invention to efficiently and effectively position a camera and protect the camera from water damage. The telescopic pole 3 comprises a first pole end 4 and a second pole end 5. The first pole end 4 relates to the region of the telescopic pole 3 which, in the preferred usage of the present invention, is proximal to the camera. The second pole end 5 relates to the region of the telescopic pole 3 opposite the first pole end 4 which, in the preferred usage of the present invention, is distal from a camera and closer to the ground anchor 10. The first pole end 4 is mounted through the buoyant body 2. This arrangement appropriately positions the first pole end 4 so that the buoyant body 2 may rotate in place but may not translate along the telescopic pole 3. The camera-attachment mechanism 1 is mounted onto the first pole end 4. In this way, the camera-attachment mechanism 1, and consequently, a mounted camera, are positioned above the buoyant body 2, thus preventing the camera from being submerged under rising waters. The second pole end 5 is mounted onto the base platform 9. This arrangement ensures that the base platform 9 is positioned offset from the camera-attachment mechanism 1. The telescopic pole 3 is positioned normal to the base platform 9. Thus, the telescopic pole 3 is able hold the mounted camera in a vertical upright position from the base platform 9. The ground anchor 10 is mounted onto the base platform 9, opposite the second pole end 5. In this way, the ground anchor 10 may secure into the ground through the application of force to the base platform 9.

The buoyant body 2 must be capable of supporting the weight of a camera. To achieve this, the buoyant body 2 may be made of a high-density foam material. The high-density foam material ensures that not only will the buoyant body 2 retain its shape in response to incident objects but also that the buoyant body 2 can float under the weight of the mounted camera and the camera-attachment mechanism 1. The buoyant body 2 may be made of any of a variety of materials to achieve this, including a variety of lightweight polymeric or rubber foams.

The present invention must be able to extend and contract in response to vertical forces from rising water and forces resulting from gravity. To improve the ability of the present invention to respond to these potential fluctuations, the telescopic pole 3, the base platform 9, and the ground anchor 10 may be made of aluminum. As a lightweight and non-corrosive metal, aluminum enables the telescopic pole 3 to extend in response to forces acting upon the buoyant body 2, while preventing physical deterioration due to rust or pitting effects. In an alternative embodiment, the telescopic pole 3, the base platform 9, and the ground anchor 10 may be made of steel, or a variety of other lightweight metals capable of providing adequate structural integrity. The telescopic pole 3, the base platform 9, and the ground anchor 10 may further be coated in a waterproof layer, thus preventing chemical deterioration of the steel.

Figure 5:
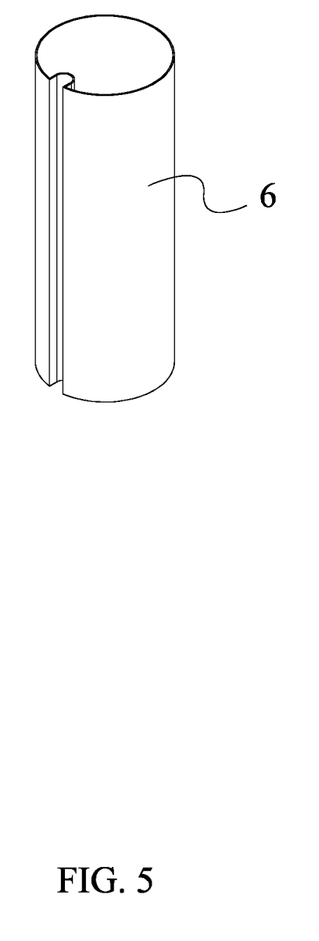
FIG. 5 is a top-left perspective view of a pole member of the present invention.

The camera must be mounted so that the camera will not spin or move undesirably due to the influence of wind or other such external forces. To prevent this, the telescopic pole 3 may further comprise a plurality of pole members 6. The plurality of pole members 6 relates to the segments which join together to form the telescopic pole 3. The plurality of pole members 6 is serially and slidably sleeved with each other. This arrangement ensures that the telescopic pole 3 may extend and retract as desired. Further, a transversal tubular cross section of each of the plurality of pole members 6 is a non-circular shape, as shown in FIG. 5. In this way, each of the plurality of pole members 6 is prevented from rotating relative to the other members.

Figure 4:
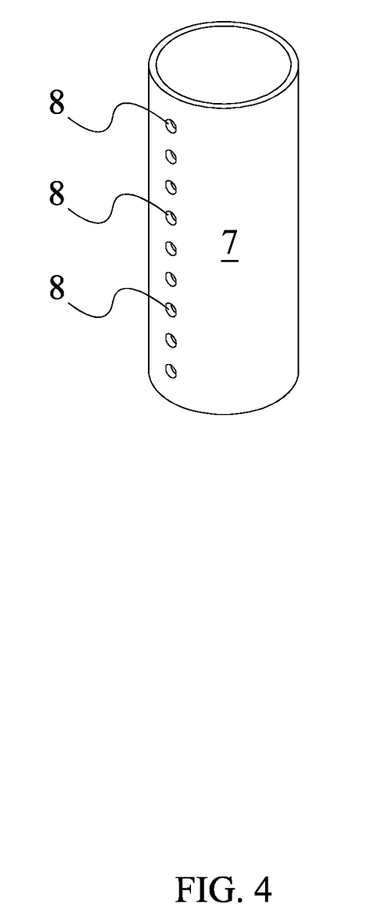
FIG. 4 is a top-left perspective view of the last member of the present invention.

When collapsing after being in an elevated position after flooding or high-water conditions, the telescopic pole 3 needs to be able to collapse to an appropriate, more portable shape. To enable this, the telescopic pole 3 may further comprise a plurality of pole members 6 and a plurality of drainage holes 8, as shown in FIG. 4. The plurality of pole members 6 relates to the segments which join together to form the telescopic pole 3. The plurality of drainage holes 8 relates to a linear pattern of preferably circular cuts into the telescopic pole 3. The plurality of pole members 6 is serially and slidably sleeved with each other. This arrangement allows the plurality of pole members 6 to elevate and lower the position of the camera-attachment mechanism 1. In an exemplary embodiment, the telescopic pole 3 expands to a length of 14 feet and contracts to a length of 3 feet. The plurality of drainage holes 8 laterally traverses through a last member 7 from the plurality of pole members 6. The last member 7 relates to the member of the plurality of pole members 6 closest to the ground anchor 10 when the present invention is in an extended configuration. In this way, the plurality of drainage holes 8 enables collected water to escape from the telescopic pole 3 as the telescopic pole 3 retracts. The last member 7 is positioned adjacent to the base platform 9. This arrangement ensures that the last member 7 is appropriately positioned to collect and subsequently release water through the plurality of drainage holes 8. The plurality of drainage holes 8 is distributed along the last member 7. Thus, collected water may exit the telescopic pole 3 under the pressure of the collapsing plurality of pole members 6 and force due to gravity.

Figure 2:
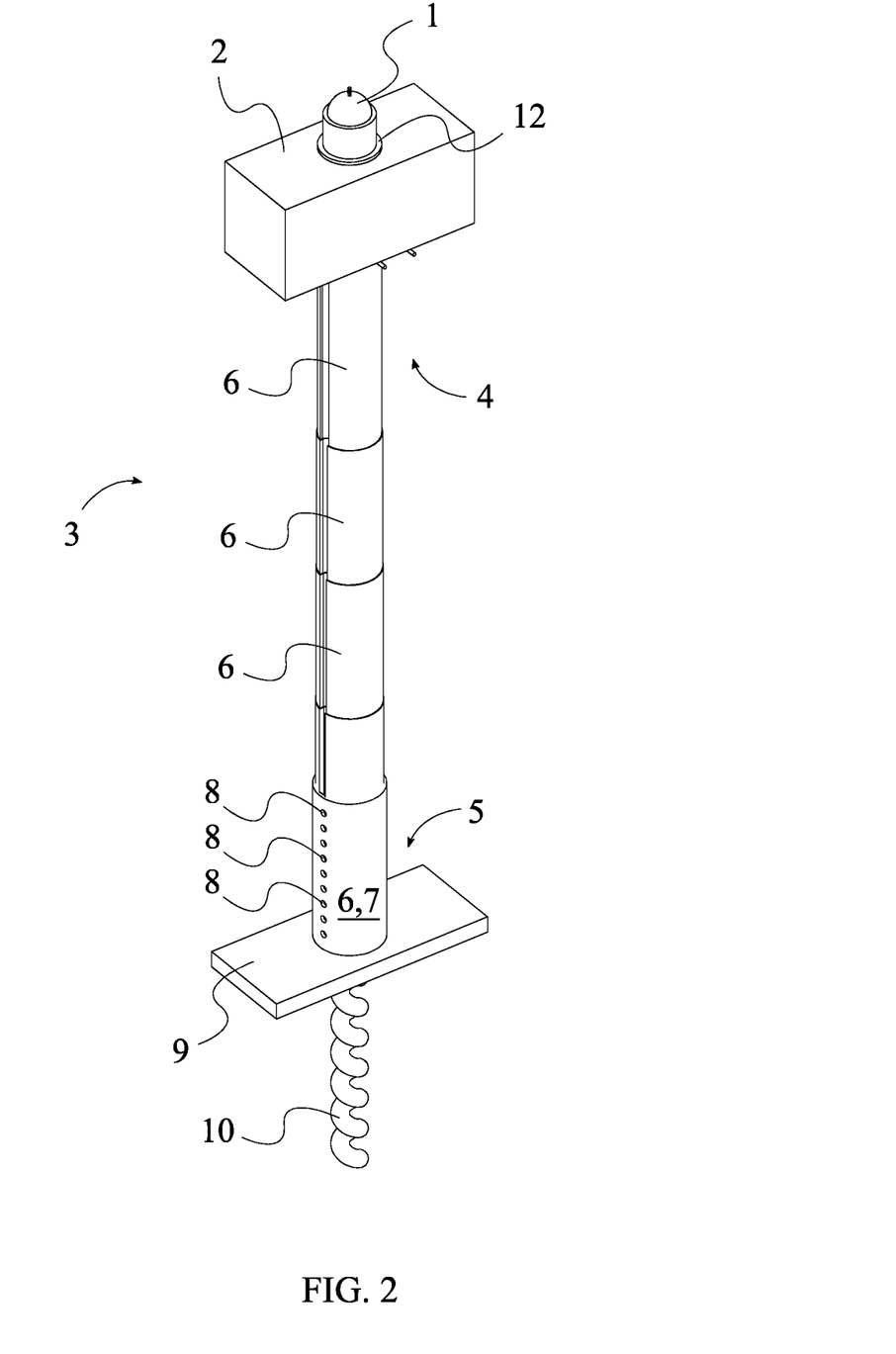
FIG. 2 is a top-right perspective view of the present invention.

The ground anchor 10 must be capable of adapting to different types of soft land. To enable this, the ground anchor 10 may be a corkscrew, as shown in FIG. 2. The corkscrew relates to a helical configuration of the ground anchor 10, preferably with a pointed tip. The corkscrew is positioned normal to the base platform 9. In this way, a user may apply a twisting force to the present invention in order to press the ground anchor 10 further into the ground.

Figure 6:
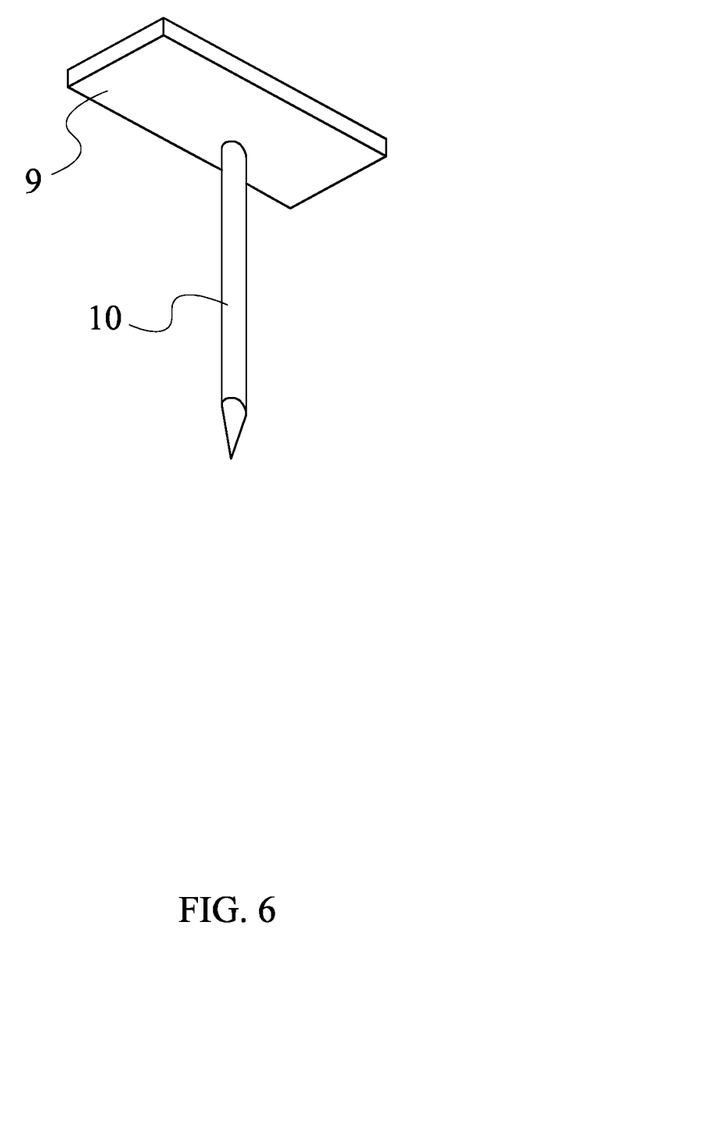
FIG. 6 is a bottom-left perspective view of a spike anchor of the present invention.

In other cases, the ground anchor 10 must adapt to different types of hard or firm land. To enable this, the ground anchor 10 may be a spike, as shown in FIG. 6. The spike relates to a generally cylindrical configuration of the ground anchor 10, preferably with a pointed tip. The spike is positioned normal to the base platform 9. In this way, a user may apply a downward force to the present invention in order to press the ground anchor 10 further into the ground.

The user may wish to adjust the position of a camera mounted to the camera-attachment mechanism 1. To enable this, the camera-attachment mechanism 1 may be swivelably mounted to the buoyant body 2. In this way, the user may turn the camera about the camera-attachment mechanism 1.

Figure 3:
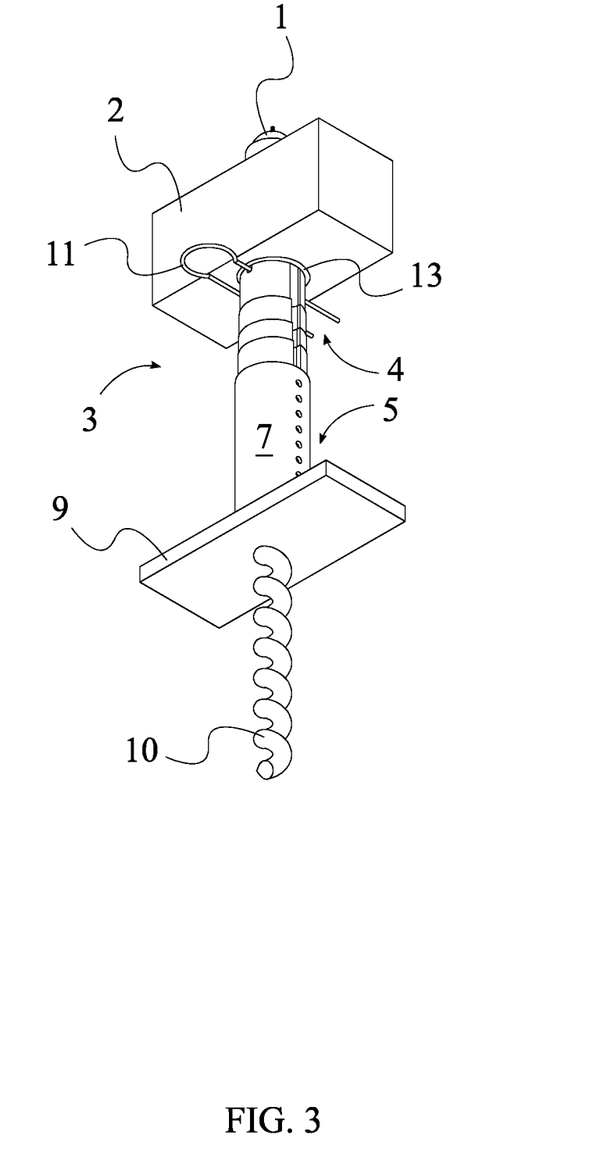
FIG. 3 is a bottom-right perspective view of the present invention.

The buoyant body 2 may require supplemental support in addition to the friction fit which may otherwise secure the position of the buoyant body 2. To this end, the present invention may further comprise a fastener 11, as shown in FIG. 3. The fastener 11 may be any kind of pins, screws, bolts, nails, or a variety of other rigid devices capable of connecting to the present invention. The fastener 11 is laterally mounted to the telescopic pole 3. This arrangement enables the fastener 11 to retain its position relative to the telescopic pole 3. The fastener 11 is pressed against the buoyant body 2, opposite the camera-attachment mechanism 1. Thus, the fastener 11 prevents the buoyant body 2 from sliding down along the telescopic pole 3 during use.

In many cases, the fastener 11 may physically damage the telescopic pole 3 or the buoyant body 2 if left alone. To prevent this potential damage, the present invention may further comprise a first washer 12 and a second washer 13. The first washer 12 is preferably a flat metal ring capable of dispersing acute pressures into broad, less damaging pressures. Similarly, the second washer 13 is preferably a flat metal ring capable of dispersing acute pressures into broad, less damaging pressures, as shown in FIG. 3. The first pole end 4 is positioned through the first washer 12 and the second washer 13. This arrangement prevents rotational movement of the first washer 12 and the second washer 13 and simultaneously aligns the first washer 12 concentrically with the second washer 13. The buoyant body 2 is positioned in between the first washer 12 and the second washer 13. In this way, the buoyant body 2 is protected from acute pressures applied on either side of the buoyant body 2. The second washer 13 is positioned in between the buoyant body 2 and the fastener 11. Thus, the first washer 12 is held in place by the mounted camera and the buoyant body 2, while the second washer 13 is held in place by the buoyant body 2 and the fastener 11.

Although the invention has been explained in relation to its preferred embodiment, it is to be understood that many other possible modifications and variations can be made without departing from the spirit and scope of the invention as hereinafter claimed.

What is claimed is:

1. A floatable mount for a hunting camera comprises:
a camera-attachment mechanism;
a buoyant body;
a telescopic pole;
a base platform;
a ground anchor;
the telescopic pole comprises a first pole end and a second pole end;
the first pole end being mounted through the buoyant body;
the camera-attachment mechanism being mounted onto the first pole end;
the second pole end being mounted onto the base platform;
the telescopic pole being positioned normal to the base platform; and
the ground anchor being mounted onto the base platform, opposite the second pole end.

2. The floatable mount for a hunting camera as claimed in claim 1, wherein the buoyant body is made of a high-density foam material.

3. The floatable mount for a hunting camera as claimed in claim 1, wherein the telescopic pole, the base platform, and the ground anchor are made of aluminum.

4. The floatable mount for a hunting camera as claimed in claim 1, comprises:
the telescopic pole further comprises a plurality of pole members;
the plurality of pole members being serially and slidably sleeved with each other; and
a transversal tubular cross section of each of the plurality of pole members being a non-circular shape.

5. The floatable mount for a hunting camera as claimed in claim 1 comprises:
the telescopic pole further comprises a plurality of pole members and a plurality of drainage holes;
the plurality of pole members being serially and slidably sleeved with each other;
the plurality of drainage holes laterally traversing through a last member from the plurality of pole members;
the last member being positioned adjacent to the base platform; and
the plurality of drainage holes being distributed along the last member.

6. The floatable mount for a hunting camera as claimed in claim 1 comprises:
the ground anchor being a corkscrew; and
the corkscrew being positioned normal to the base platform.

7. The floatable mount for a hunting camera as claimed in claim 1 comprises:
the ground anchor being a spike; and
the spike being positioned normal to the base platform.

8. The floatable mount for a hunting camera as claimed in claim 1 comprises:
the camera-attachment mechanism being swivelably mounted to the buoyant body.

9. The floatable mount for a hunting camera as claimed in claim 1 comprises:
a fastener;
the fastener being laterally mounted to the telescopic pole; and
the fastener being pressed against the buoyant body, opposite the camera-attachment mechanism.

10. The floatable mount for a hunting camera as claimed in claim 9 comprises:
a first washer;
a second washer;
the first pole end being positioned through the first washer and the second washer;
the buoyant body being positioned in between the first washer and the second washer; and
the second washer being positioned in between the buoyant body and the fastener.

11. A floatable mount for a hunting camera comprises:
a camera-attachment mechanism;
a buoyant body;
a telescopic pole;
a base platform;
a ground anchor;
the telescopic pole comprises a first pole end, a second pole end, and a plurality of pole members;
the first pole end being mounted through the buoyant body;
the camera-attachment mechanism being mounted onto the first pole end;
the second pole end being mounted onto the base platform;
the telescopic pole being positioned normal to the base platform;
the ground anchor being mounted onto the base platform, opposite the second pole end;
the plurality of pole members being serially and slidably sleeved with each other; and
a transversal tubular cross section of each of the plurality of pole members being a non-circular shape.

12. The floatable mount for a hunting camera as claimed in claim 11, wherein the buoyant body is made of a high-density foam material.

13. The floatable mount for a hunting camera as claimed in claim 11, wherein the telescopic pole, the base platform, and the ground anchor are made of aluminum.

14. The floatable mount for a hunting camera as claimed in claim 11 comprises:
the telescopic pole further comprises a plurality of pole members and a plurality of drainage holes;
the plurality of pole members being serially and slidably sleeved with each other;
the plurality of drainage holes laterally traversing through a last member from the plurality of pole members;
the last member being positioned adjacent to the base platform; and
the plurality of drainage holes being distributed along the last member.

15. The floatable mount for a hunting camera as claimed in claim 11 comprises:
the ground anchor being a corkscrew; and
the corkscrew being positioned normal to the base platform.

16. The floatable mount for a hunting camera as claimed in claim 11 comprises:
the ground anchor being a spike; and
the spike being positioned normal to the base platform.

17. The floatable mount for a hunting camera as claimed in claim 11 comprises:
the camera-attachment mechanism being swivelably mounted to the buoyant body.

18. The floatable mount for a hunting camera as claimed in claim 11 comprises:

a fastener;
the fastener being laterally mounted to the telescopic pole; and
the fastener being pressed against the buoyant body, opposite the camera-attachment mechanism.

19. The floatable mount for a hunting camera as claimed in claim 18 comprises:
a first washer;
a second washer;
the first pole end being positioned through the first washer and the second washer;
the buoyant body being positioned in between the first washer and the second washer; and
the second washer being positioned in between the buoyant body and the fastener.

\* \* \* \* \*